US011210358B2

(12) United States Patent
Sror et al.

(10) Patent No.: US 11,210,358 B2
(45) Date of Patent: Dec. 28, 2021

(54) DEEP LEARNING APPROACH TO MITIGATE THE COLD-START PROBLEM IN TEXTUAL ITEMS RECOMMENDATIONS

(71) Applicant: Intuit Inc., Mountain View, CA (US)

(72) Inventors: Elik Sror, Hod Hasharon (IL); Oren Sar Shalom, Nes Ziona (IL); Rami Cohen, Ashkelon (IL)

(73) Assignee: Intuit Inc., Mountain View, CA (US)

( * ) Notice: Subject to any disclaimer, the term of this patent is extended or adjusted under 35 U.S.C. 154(b) by 209 days.

(21) Appl. No.: 16/699,545

(22) Filed: Nov. 29, 2019

(65) Prior Publication Data
US 2021/0165848 A1 Jun. 3, 2021

(51) Int. Cl.
| | |
|---|---|
| *G06F 16/957* | (2019.01) |
| *G06F 17/16* | (2006.01) |
| *G06N 3/08* | (2006.01) |
| *G06F 12/06* | (2006.01) |
| *G06F 12/02* | (2006.01) |
| *G06F 12/0895* | (2016.01) |

(52) U.S. Cl.
CPC .......... *G06F 16/9574* (2019.01); *G06F 17/16* (2013.01); *G06N 3/08* (2013.01); *G06F 12/0238* (2013.01); *G06F 12/0692* (2013.01); *G06F 12/0895* (2013.01)

(58) Field of Classification Search
CPC ..... G06F 2212/1016; G06F 2212/1044; G06F 12/12; G06F 17/16; G06F 3/0611
See application file for complete search history.

(56) References Cited

U.S. PATENT DOCUMENTS

| | | | |
|---|---|---|---|
| 2011/0252210 A1* | 10/2011 | Davies | G06F 3/0685 711/165 |
| 2012/0102273 A1* | 4/2012 | Chang | G06F 12/0692 711/143 |
| 2013/0332676 A1* | 12/2013 | Kotla | G06F 12/0895 711/129 |
| 2020/0073798 A1* | 3/2020 | Cho | G06F 12/0238 |

OTHER PUBLICATIONS

Sar Shalom, Oren et al., "Data Quality Matters in Recommender Systems", ReeSys '15: Proceedings of the 9th ACM Conference on Recommender Systems; pp. 257-260; Sep. 16-20, 2015 (4 pages).

* cited by examiner

*Primary Examiner* — Barbara B Anyan
(74) *Attorney, Agent, or Firm* — Ferguson Braswell Fraser Kubasta PC (57) ABSTRACT

A method for mitigating cold starts in recommendations includes receiving a request that identifies a requested page and identifying a content vector of the requested page. The content vector is generated based on providing text of the requested page to a neural network text encoder. The method further includes selecting, based on a rank engine and the content vector, a link to a cold start page that does not satisfy a threshold level of interaction data. The rank engine ranks the selected link above a second link to a warm page that does satisfy the threshold level of the interaction data. The method further includes presenting the requested page with the selected link.

20 Claims, 7 Drawing Sheets

DEEP LEARNING APPROACH TO MITIGATE THE COLD-START PROBLEM IN TEXTUAL ITEMS RECOMMENDATIONS

BACKGROUND

Websites serve pages to users who are looking for information. As users attempt to find pages with pertinent information, such users may click on multiple links, user interaction data (also referred to as interaction data or click data) is generated. To assist users in his or her search, websites may provide users links to recommended pages. Such links may be recommended based on the interaction data. Different pages on the system have different amounts of interaction data. For instance, new pages, which are referred to as cold start pages, may have little if any interaction data when they are first added to the website. Thus, there is a challenge in recommending pages that include pertinent information to a currently presented page but for which there is insufficient interaction data.

SUMMARY

In general, in one aspect, one or more embodiments relate to a method that includes receiving a request that identifies a requested page and identifying a content vector of the requested page. The content vector is generated based on providing text of the requested page to a neural network text encoder. The method further includes selecting, based on a rank engine and the content vector, a link to a cold start page that does not satisfy a threshold level of interaction data. The rank engine ranks the selected link above a second link to a warm page that does satisfy the threshold level of the interaction data. The method further includes presenting the requested page with the selected link.

In general, in one aspect, one or more embodiments relate to a system that includes a processor and a memory coupled to the processor. The memory includes a server application. The server application executes on the processor and is configured for receiving a request that identifies a requested page and identifying a content vector of the requested page. The content vector is generated based on providing text of the requested page to a neural network text encoder. The server application is further configured for selecting, based on a rank engine and the content vector, a link to a cold start page. The cold start page does not satisfy a threshold level of interaction data. The rank engine ranks the selected link above a second link to a warm page that does satisfy the threshold level of the interaction data. The server application is further configured for presenting the requested page with the selected link.

In general, in one aspect, one or more embodiments relate to a method that includes generating a content vector from a cold start page that does not satisfy a threshold level of interaction data. A plurality of content vectors includes the content vector and a plurality of pages includes the cold start page and a warm page that satisfies a threshold level of the interaction data. The method further includes training a rank function using the interaction data. The rank function includes a first matrix. The first matrix has first matrix dimensions including a first dimension and a second dimension. The first dimension includes a plurality of first elements for the plurality of pages and the second dimension including a plurality of second elements for a plurality of latent features that correspond to elements of the content vector. The method further includes generating, based on the plurality of content vectors, a second matrix having second matrix dimensions. The second matrix dimensions are the same as the first matrix dimensions. The method further includes generating, based on updating the first matrix with the second matrix, an updated first matrix that ranks the cold start page above the warm page.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide links to recommended pages (referred to as cold start pages) for which there is insufficient user interaction data. The links to the cold start pages are provided based on a ranking function that is trained with user interaction data (referred to as interaction data) and then updated. The rank function is updated based on the output of a text encoder. The updated rank function may rank cold start pages above warm pages so that newly added pages to the system that are relevant to the requested page may be identified and recommended.

A page may be a cold start page or a warm page based on whether there is a sufficient amount of interaction data for the page. The sufficiency of interaction data for a page may be based on a combination of a number of clicks selecting the page, the length of time a page has been available on the system (referred to as the age of the page), and an amount of cross links to the page from other pages on the system. For example, a page that has been newly added to the system may not have any clicks, may not have been available from the system for a long enough period of time, and may not have any cross links from other pages on the system. The new page may be referred to as a cold start page, which is in contrast to a warm page which has been clicked, has been available from the system, and is included in cross links from other pages.

In response to receiving a request, a server application identifies the requested page and transmits the content of the requested page. The content of the requested page is transmitted with recommended links that may include cold start links to cold start pages ranked above warm pages on the system.

Figure 1A:
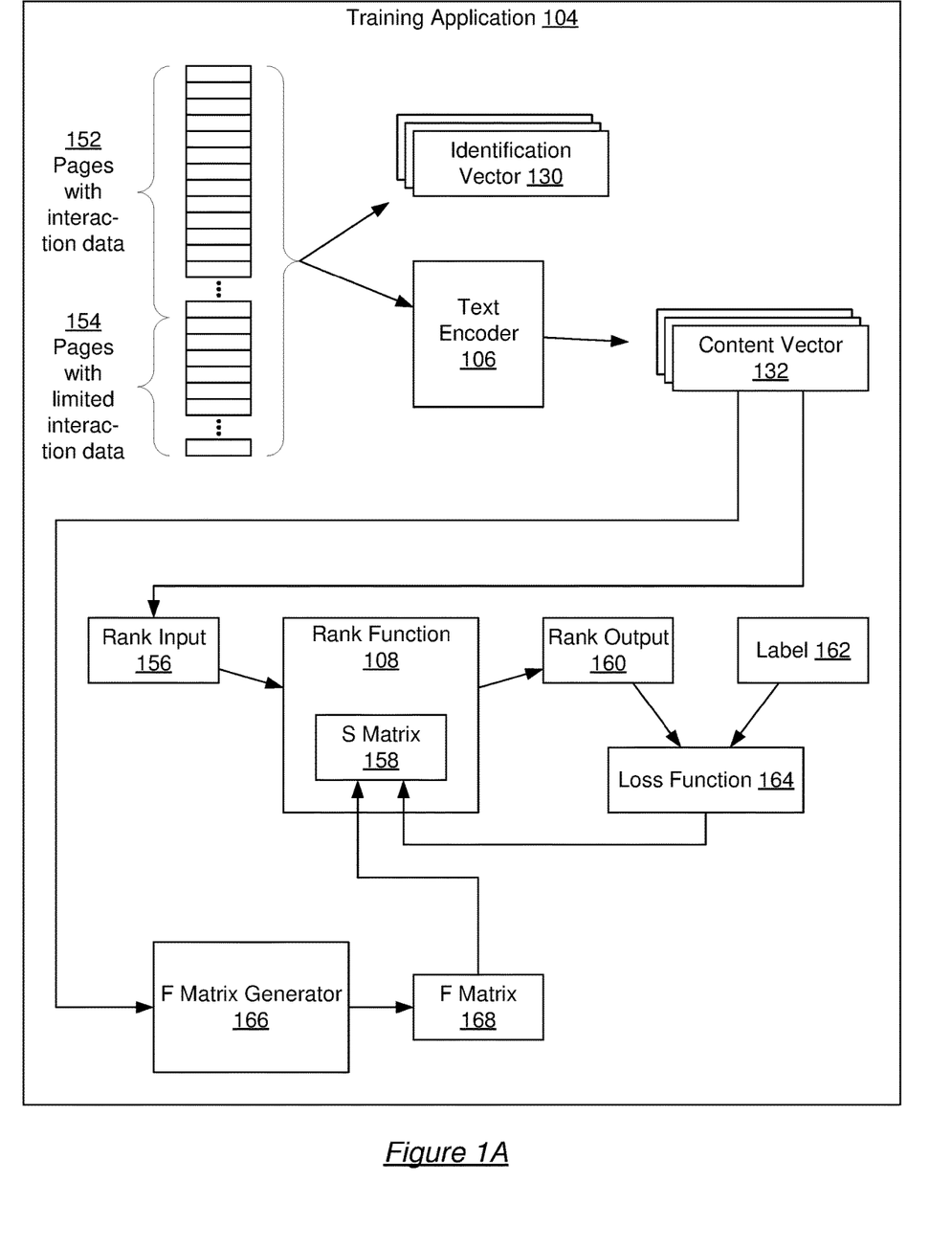
FIG. 1A, FIG. 1B, and FIG. 1C show diagrams of systems in accordance with disclosed embodiments.
Figure 1B:
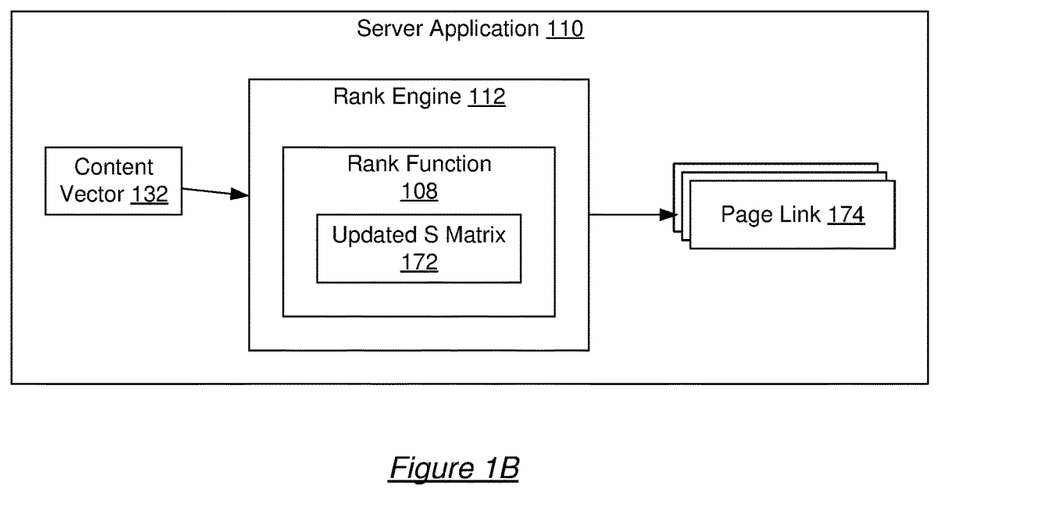
Figure 1C:
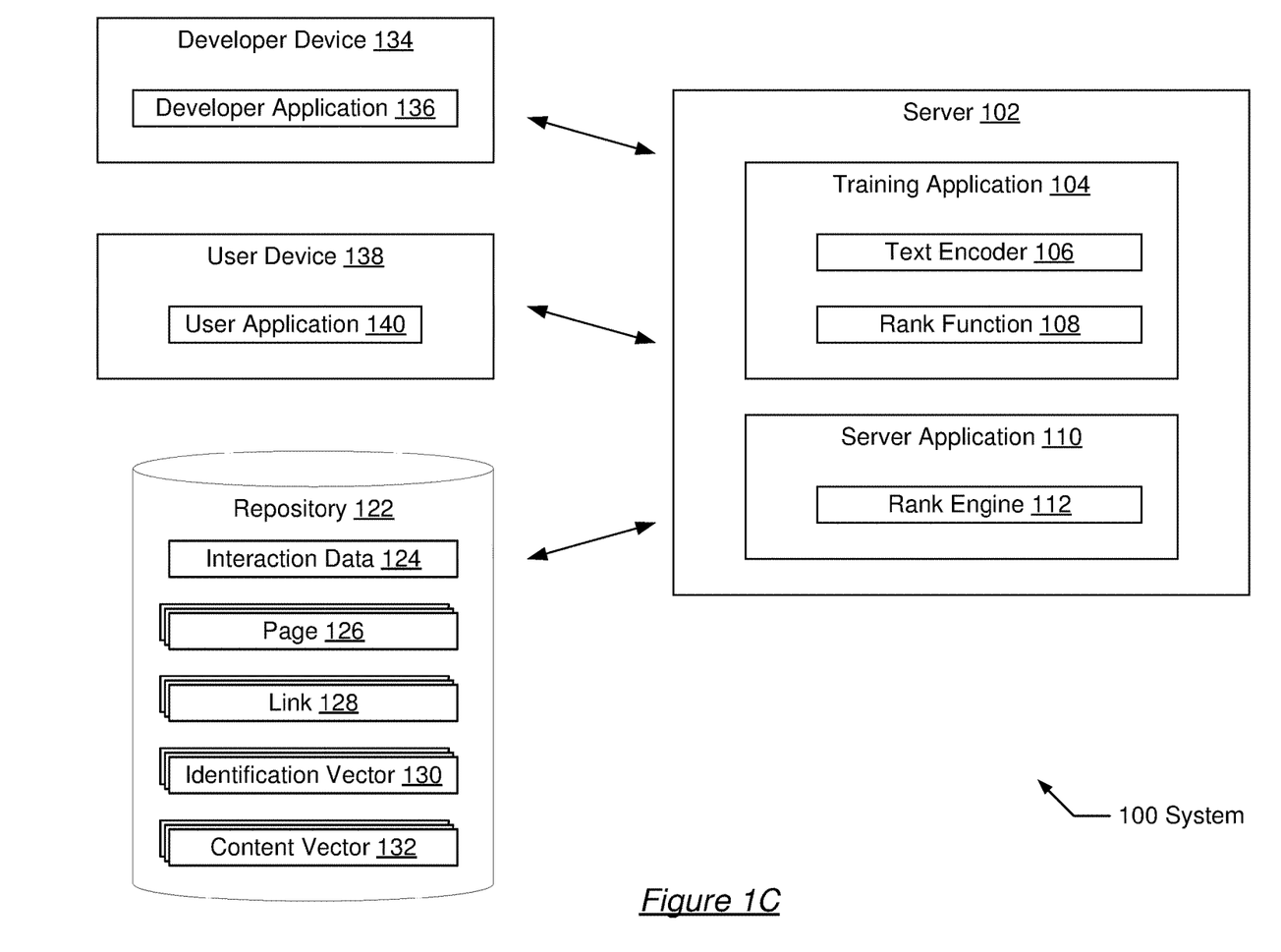

FIG. 1A, FIG. 1B, and FIG. 1C show diagrams of embodiments that are in accordance with the disclosure to mitigate cold starts in textual item recommendations. The embodiments of FIG. 1A, FIG. 1B, and FIG. 1C may be combined and may include or be included within the features and embodiments described in the other figures of the application. The features and elements of FIG. 1A, FIG. 1B, and FIG. 1C are, individually and as a combination, improvements to technology computing systems, including computing systems that provide links to recommended pages. The various elements, systems, and components shown in FIG. 1A, FIG. 1B, and FIG. 1C may be omitted, repeated, combined, and/or altered as shown from FIG. 1A, FIG. 1B, and FIG. 1C. Accordingly, the scope of the present disclosure should not be considered limited to the specific arrangements shown in FIG. 1A, FIG. 1B, and FIG. 1C.

Turning to FIG. 1A, the training application (104) is set of programs running on the server (102) (shown in FIG. 1C). The training application (104) trains the rank function (108) using the pages (152) and (154). The pages (152) and (154) are associated with the interaction data (124) (shown in FIG. 1C). The interaction data (124) identifies the clicks made from a source page to a target page. A target page with a higher number of clicks from a source page may be ranked higher than a different page with a fewer number of clicks from the same source page.

The pages (152) are distinct from the pages (154) based on the amount of interaction data for the individual pages. The pages (152) may be referred to as warm pages and the pages (154) may be referred to as cold start pages. For a warm page, a threshold amount of interaction data has been acquired. For a cold start page, a threshold amount of interaction data has not been acquired. The threshold amount of interaction data may be based on an amount of interaction data, an age of the page, and an amount of cross links to the page from other pages on the system (100).

A warm page may satisfy the threshold amount of interaction data by having a threshold amount of interaction data, a threshold age, and/or a threshold amount of cross links. A cold start page may not satisfy the threshold level of interaction data by not having the threshold amount of interaction data, the threshold age, and the threshold amount of cross links.

The amount of interaction data for a page may include the number of times a page was clicked on from any previous page. A threshold amount of interaction data based on the amount of interaction data may be satisfied by a predetermined number of clicks (e.g., 10,000 clicks) or a percentage (e.g., 0.01 percent) of total clicks present in the interaction data (124).

The age of the page may identify lengths of time related to the creation of a page, the publication or release date of a page, or the last update to the page. A threshold amount of interaction data based on the age of a page may be satisfied when a predetermined number of days has passed since one of the dates related to the page. For example, the threshold may be for 30 days from the publication date of a page.

The amount of cross links may identify the number of links from other pages to a target page. A threshold amount of interaction data based on the amount of cross links may be satisfied by a predetermined number of cross links to a target page or a percentage. For example, a page may be a warm page when there are, e.g., 1,000 cross links from other pages to the page. As another example, a page may be a warm page when 0.1 percent of the pages of the system include a cross link to the page.

Additionally, the threshold amount of interaction data required to differentiate between warm pages (152) and cold start pages (154) may be a combination of thresholds. For example, to be a warm page using a combination of thresholds, a page may need to have been published for at least 30 days and have been clicked on at least 2,000 times.

As another example, to be a warm page, a page may need to have been clicked on at least one time. Otherwise, the page may be a cold start page.

For the pages (152) and (154), the training application (104) may generate identification vectors, which include the identification vector (130). The training application may also apply the text encoder (106) to the pages (152) and (154) to generate the content vectors (132).

The identification vectors may be referred to as one hot vectors that identify individual pages. The identification vector (130) may have as many elements as there are pages stored by the system (100), which may be the sum total of pages (152) and (154). One element of the one hot vector is set to "1" and all other elements are set to "0" so that each page is associated with a different element of an identification vector.

The text encoder (106) generates a content vector from a page. As an example, the text encoder (106) may take the first 30 words of the title of a page and convert those words to word vectors, which are one hot vectors that identify the words used by the pages. The word vectors from the title may be combined to form the content vector (132). Combining the word vectors may be done by passing the word vectors through an encoder neural network (e.g., a convolutional neural network (CNN), a recurrent neural network (RNN), and attention network, etc.). For example, word2vec algorithms may be used as either a continuous bag of words or as a skip gram. The encoder network may be pretrained, may be trained using the pages of the system (100), or both.

The training application (104) generates sets of rank inputs and labels for the rank function (108). The rank input (156) may include a pair of a source page and a target page with the label (162) that identifies whether the target page was clicked on from the source page. In the pair, the source page may be identified by the content vector generated from the source page and the target page may be identified with the identification vector for the target page. The rank input (156) and the label (162) may include multiple pairs with labels. For example, the rank input (156) may include 11 source page and target page pairs with 11 labels. One of the 11 labels may identify one of the source page and target page pairs as being clicked on with the remaining 10 labels identifying source page and target page pairs that were not clicked on.

The rank function (108) takes the rank input (156) and generates the rank output (160). The rank function (108) may operate on a single source page and target page pair by applying the S matrix (158) to the pair. For example, the identification vector of the target page may be multiplied by the S matrix, with that product being multiplied by the content vector of the source page to generate a single value for the pair using the S matrix. The S matrix (158) may have a number of rows equal to the number of pages (152) and (154) and a number of columns equal to the number elements in the content vector (132).

The rank output (160) is the output generated by the rank function (108) from the rank input (156). When the rank input (156) includes multiple pairs, the rank output (160) may include multiple elements, to which a softmax function is applied to identify one of the input pairs as the pair of a source and target pages that were clicked on. Extending the example using 11 source page and target page pairs, the rank output (160) may be an 11 element vector with one dimension for each of the inputs from the rank input (156). Applying the softmax function to the 11 element vector converts manipulates the values of the 11 element vector so that the value of one of the elements dominates the remaining values to identify the source target pair that was clicked on.

The rank output (160) is compared to the label (162) by the loss function (164). The loss function calculates the error between the rank output (160) and the label (162) and feeds the error back to the S matrix (158) so that future rank outputs generated with the rank function (108) will more closely match the label (162).

After training the rank function (108) to generate the S matrix (158), the training application generates the F matrix (168) with the F matrix generator (166). The F matrix generator (166) assembles the F matrix from the content vectors generated by the text encoder (106). Each row of the F matrix (168) is one of the content vectors generated by the text encoder (106) for the pages (152) and (154) of the system (100). In this manner, the S matrix (158) and the F matrix (168) may have the same number of elements and dimensions. The F matrix (168) is added to the S matrix (158) to generate the updated S matrix (172) (shown in FIG. 1B). Updating the S matrix with the F matrix changes the ranking and recommendation values output by the rank function (108) so that a cold start page may be ranked above a warm page.

Turning to FIG. 1B, the server application (110) uses the updated S matrix to generate page links, including the page link (174). The server application (110) may service a request for the page (126) (shown in FIG. 1C) from which the content vector (132) was generated using the text encoder (106) (shown in FIGS. 1A and 1C).

The rank engine (112) of the server application (110) includes the rank function (108) with the updated S matrix (172) that is trained by the training application (104) (shown in FIG. 1A). The rank engine (112) takes the content vector (132) as an input and outputs the recommended page links, including the page link (174). The page link (174) is a recommended link to a page of the system (100).

The recommended links may be generated by multiplying the content vector (132) by the updated S matrix (172) to generate a recommendation vector with the same number elements as the identification vectors. The values of the elements of the recommendation vector identify the strength of the recommendation for pages associated with the elements. The elements with the highest values have the strongest recommendations and a number (e.g., 5) of the highest values may be used to identify the number of recommended pages. For example, if the first element of the recommendation vector has the highest value, the link to the page associated with the first element of the recommendation vector may be presented as the top recommendation.

Turning to FIG. 1C, the system (100) includes the server (102), the repository (122), the developer device (134), and the user device (138). The server (102) may include the training application (104) and the server application (110).

The training application (104) is a program on the server (102). The training application (104) includes the text encoder (106) and the rank function (108). The training application (104) trains the rank function (108) using content vectors generated by the text encoder (106). The training application (104) may be operated or controlled by the developer device (134) with the developer application (136).

The server application (110) is a program on the server (102). The server application (110) includes the rank engine (112). The server application (110) services requests from the user device (138) and transmits pages, which may include the page (126) from the repository (122), with recommended links, which may include the link (128) from the repository (122), to the user device (138). The recommended links are generated with the rank engine (112).

Figure 4A:
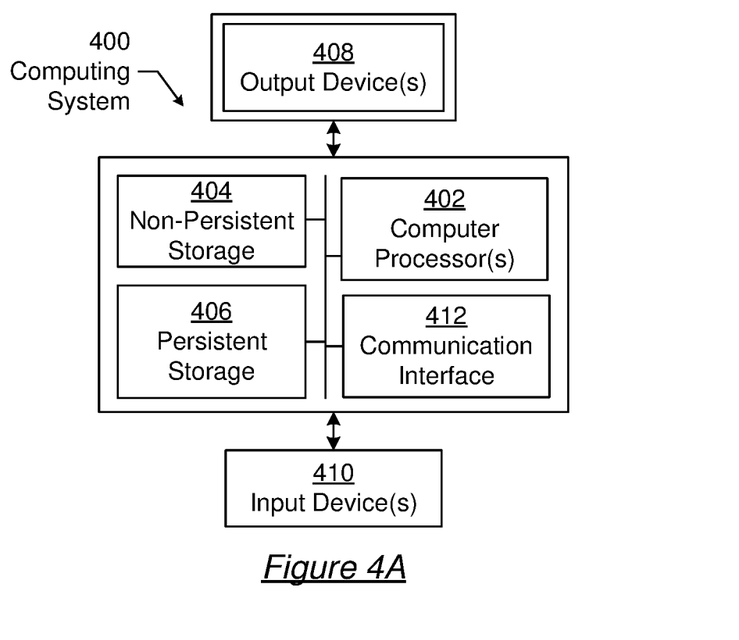
FIG. 4A and FIG. 4B show computing systems in accordance with disclosed embodiments.
Figure 4B:
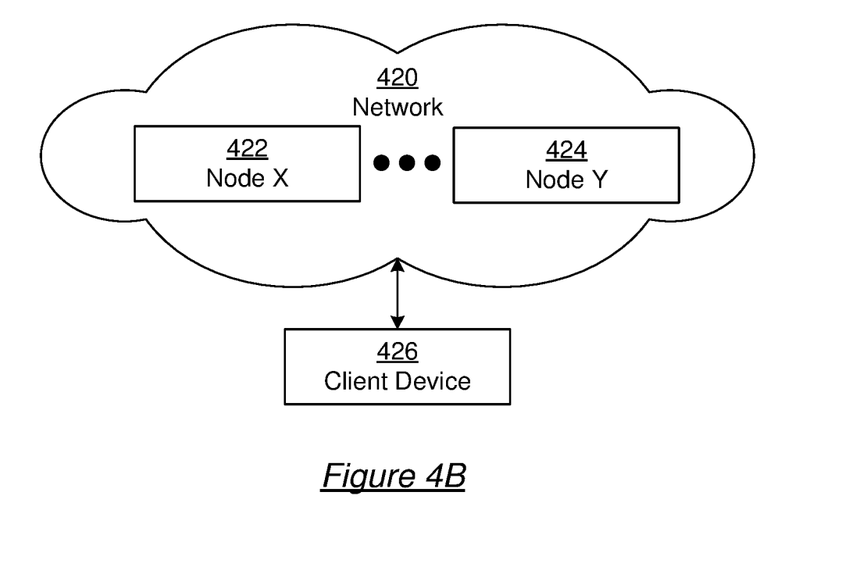

The server (102) is an embodiment of the computing system (400) and the nodes (422) and (424) of FIG. 4A and FIG. 4B. The server (102) may be one of a set of virtual machines hosted by a cloud services provider to deploy the training application (104) and the server application (110) for a financial services provider.

The repository (122) is a computing system that may include multiple computing devices in accordance with the computing system (400) and the nodes (422) and (424) described below in FIGS. 4A and 4B. The repository (122) may be hosted by a cloud services provider for the financial services provider. The cloud services provider may provide hosting, virtualization, and data storage services as well as other cloud services and the financial services provider may operate and control the data, programs, and applications that store and retrieve data from the repository. The data in the repository (122) may be processed by programs executing on the server (102). The repository (122) may be hosted by the same cloud services provider as the server (102). The repository (122) may store the interaction data (124), pages (including the page (126)), links (including the link (128)), identification vectors (including the identification vector (130)), and content vectors (including the content vector (132)).

The interaction data (124) is a recording of user interactions with the pages stored in the repository (122). The interaction data (124) may include data related to mouse movement events, mouse click events, and keyboard press events. The interaction data (124) may be referred to as click data. The interaction data (124) identifies which pages have been clicked on. The interaction data (124) may identify pairs of source pages and target pages. A source page is the page that includes the link that was clicked on. A target page is the page referenced by a link that was clicked on from a source page.

The pages stored on the repository (122) include the page (126). The pages may be web pages that are served by the server application (110) in response to requests from the user application (140).

The links stored on the repository (122) include the link (128). A link may be a uniform resource identifier (URI), uniform resource locator (URL), hyperlink, etc. that identifies one of the pages stored on the repository (122). The link (128) may identify the page (126).

The identification vectors stored on the repository (122) include the identification vector (130). An identification vector may be a vector that identifies a page with a particular element. Each identification vector may have a number of dimensions equal to the number of pages stored by the system (100) in the repository (122). The identification vector (130) may be the identification vector of the page (126).

The content vectors stored on the repository (122) include the content vector (132). A content vector is generated from a page using a text encoder and is related to the meaning of the content from within the page using a number of latent feature dimensions. The number of latent feature dimensions may be less than the number of dimensions for the identification vectors.

The developer device (134) is an embodiment of the computing system (400) and the nodes (422) and (424) of FIG. 4A and FIG. 4B. The developer device (134) includes the developer application (136) for accessing the training application (104). The developer application (136) may include a graphical user interface for interacting with the training application (104) to control training of the rank function (108).

The user device (138) is an embodiment of the computing system (400) and the nodes (422) and (424) of FIG. 4A and FIG. 4B. The user device (138) includes the user application (140) for accessing the server application (110). The user application (140) may include a graphical user interface for interacting with the server application (110) to display pages and links from the repository (122). A user may operate the user application (140) to search for pages that answer questions about using the software of the financial services provider. The results may be displayed by the user device (138) in the user application (140). The user device (138) may be operated by a customer of the financial services provider.

The developer application (136) and the user application (140) may be web browsers that access the training application (104) and the server application (110) using web pages hosted by the server (102). The developer application (136) and the user application (140) may additionally be web services that communicate with the training application (104) and the server application (110) using representational state transfer application programming interfaces (RESTful APIs). Although FIG. 1C shows a client server architecture, one or more parts of the training application (104) and the server application (110) may be local applications on the developer device (134) and the user device (138) without departing from the claimed scope.

Figure 2A:
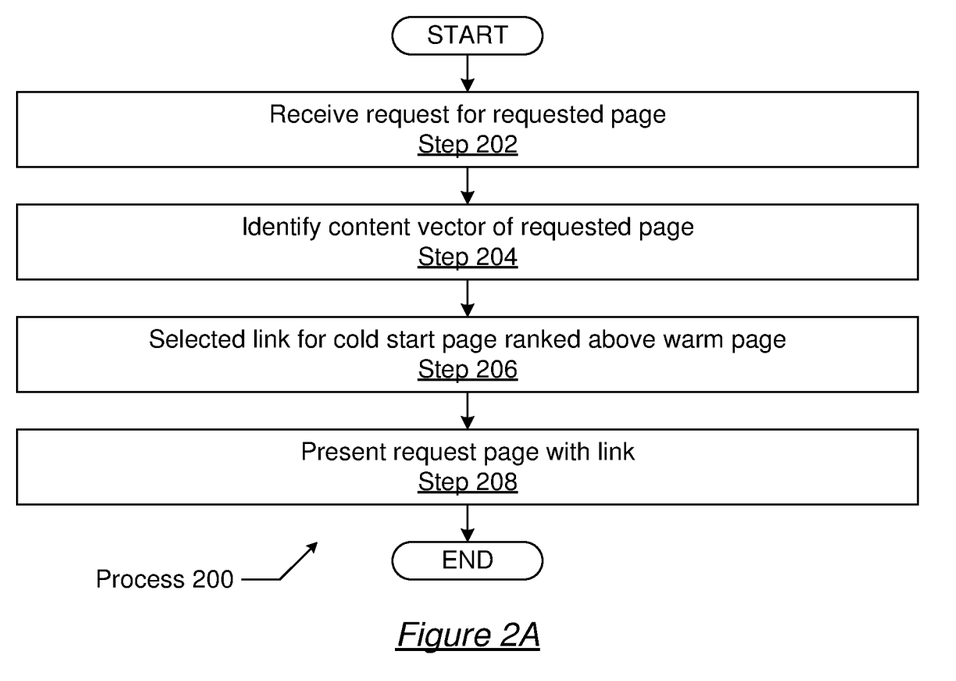
FIG. 2A and FIG. 2B show flowcharts in accordance with disclosed embodiments.
Figure 2B:
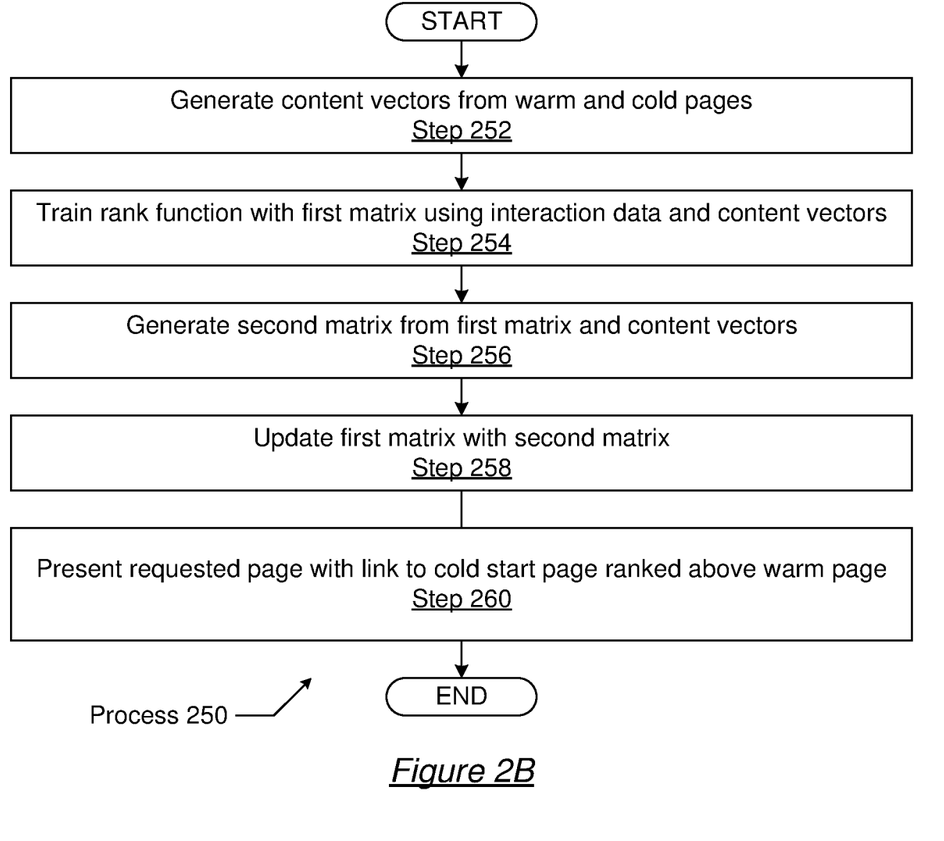

FIG. 2A and FIG. 2B show flowcharts of the process (200) and the process (250) in accordance with the disclosure. The embodiments of FIGS. 2A and 2B may be combined and may include or be included within the features and embodiments described in the other figures of the application. The features of FIGS. 2A and 2B are, individually and as an ordered combination, improvements to the technology of computing systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2A, the process (200) uses a trained and updated rank function to present cold start links. In Step 202, a request is received for a requested page. The request may be received by a server application from a user application and identify a page stored on a repository that is accessible by the server application. The request may be a hypertext transfer protocol (HTTP) "GET" request that identifies the page with a uniform resource identifier (URI).

In Step 204, a content vector is identified for a request page. The content vector may be identified by generating the content vector from the page or by looking up the content vector from a lookup table or database that identifies pages and corresponding content vectors generated from the pages. The content vector may be generated from content of the requested page and the content may include text that is input to a neural network text encoder to generate the content vector. For example, the content may include the first 10 words of a title of the page that are input to a neural network text encoder.

In Step 206, a link for a cold start page is ranked and selected above a warm page. The link may be selected with the content vector in response to inputting the content vector to a rank function of a rank engine of a server application. The output from the rank engine identifies and ranks a number of recommended links to pages. As an example, the input to the rank function may be the content vector of the requested page and the output of the rank function may be an identification vector where the values for the dimensions the identification vector indicate the strength of the recommendation of a link to a page associated with the dimension of the identification vector. A number (e.g., 5) of the pages with the highest values may be identified as recommended pages and the links to those pages selected as recommended links to be presented with the requested page.

The recommended links include the link to a cold start page (also referred to as a cold start link) that does not satisfy a threshold level of interaction data. The cold start link may be ranked above a second link to a warm page that does satisfy the threshold level of interaction data based on the updated S matrix used by the rank function. The cold start link may be selected with the content vector by using a rank engine. The rank engine may be trained using the interaction data and a plurality of pages including the cold start page, the warm page and the requested page, which is further described with FIG. 2B. The threshold level of interaction data that differentiates between cold pages and warm pages is selected from one or a combination of an amount of interaction data, an age of the page, and an amount of cross links to the page from other pages on the system.

In Step 208, the requested page is presented with a link. The requested page may be presented with the link, which is to the cold start page that does not satisfy the threshold level of interaction data. Presenting the requested page with the link may include generating a transmission page that includes the content from the requested page, includes the link within a set of recommended links, is transmitted from the server application to the user application, and is displayed by the user application on the user device.

Turning to FIG. 2B, the process (250) trains a rank function. In Step 252, content vectors are generated from warm and cold pages. The system generates a content vector for each of the pages that may be served by the system in response to requests. The pages of the system include the warm pages that satisfy the threshold level of interaction data and cold start pages that do not satisfy the threshold level of interaction data.

A content vector may be generated by identifying the title of a page and converting the words from the title to word vectors. The words identified from the title may be limited to a number of words (e.g., the first 20 words from the title). The word vectors may be input to a neural network text encoder that may include convolutional neural networks, long short term memories, attention mechanisms, etc., which generate the content vector from the word vectors.

In Step 254, a rank function is trained with a first matrix using interaction data and content vectors. The first matrix may be referred to as an S matrix that includes a first dimension of elements for the number of pages on the system and a second dimension of elements for latent features. The latent features are features that are automatically learned by the system and correspond to the elements of the content vectors. As an example, if the system has 10,000 pages and 50 latent features, the S matrix may have 10,000 rows for the first dimension and 50 columns for the second dimension. The number of latent features may be selected by a developer of the system.

The rank function is trained by a training application. The rank function generates a rank output from a rank input. The rank output may be compared to a label that corresponds to the rank input by a loss function. The loss function determines the error between the label and the rank output. The S matrix is updated based on the error determined by the loss function.

The training application may generate the rank input, which may include a source vector and a target vector. The rank input may be labeled with a label. The source vector is one of the content vectors generated with a text encoder and that corresponds to a source page, which is one of the pages on the system. The target vector may be an identification vector that identifies a target page on the system. The label identifies whether the target page was clicked on from the source page. The label may use a "1" to identify that the target page was clicked on and selected from the source page and a "0" otherwise.

In Step 256, a second matrix is generated from the first matrix and the content vectors. The second matrix may be referred to as the F matrix and has the same dimensions as the S matrix used by the rank function. By having the same dimensions, the F matrix and the S matrix may have the same number of elements in each dimension. The F matrix may be generated from the content vectors generated from the pages of the system. A row of the F matrix may be a content vector of a page of the system.

In Step 258, the first matrix is updated with the second matrix. Updating the first matrix (the S matrix) with the second matrix (the F matrix) generates an updated first matrix (also referred to as an updated S matrix) that increases the rank of a cold start page above the rank of a warm page. The first matrix (the S matrix) may be updated by adding the second matrix (the F matrix) to the first matrix, as shown in the equation below.

$$S = S + F \quad \text{(Eq. 1)}$$

Addition of these matrices is possible since the S matrix and the F matrix have the same dimensions with the number rows equal to the number pages on the system and the number of columns equal to the number of elements (also referred to as latent features) used by the context vectors. Adding the S matrix to the F matrix generates an updated S matrix that ranks pages differently from the original S matrix. Whereas the original S matrix may not rank a cold start page above a warm page due to the lack of interaction data, the updated S matrix may rank a cold start page above a warm page even though the cold start page does not meet the threshold level of interaction data.

In Step 260, a requested page is presented with a link to a cold start page ranked above a warm page. The requested page is presented with a link to the cold start page even though the cold start page does not satisfy the threshold level of interaction data. Presenting the requested page with the link may include generating a transmission page that includes the content from the requested page, includes the link within a set of recommended links, is transmitted from the server application to the user application, and is displayed by a user application on the user device.

Figure 3:
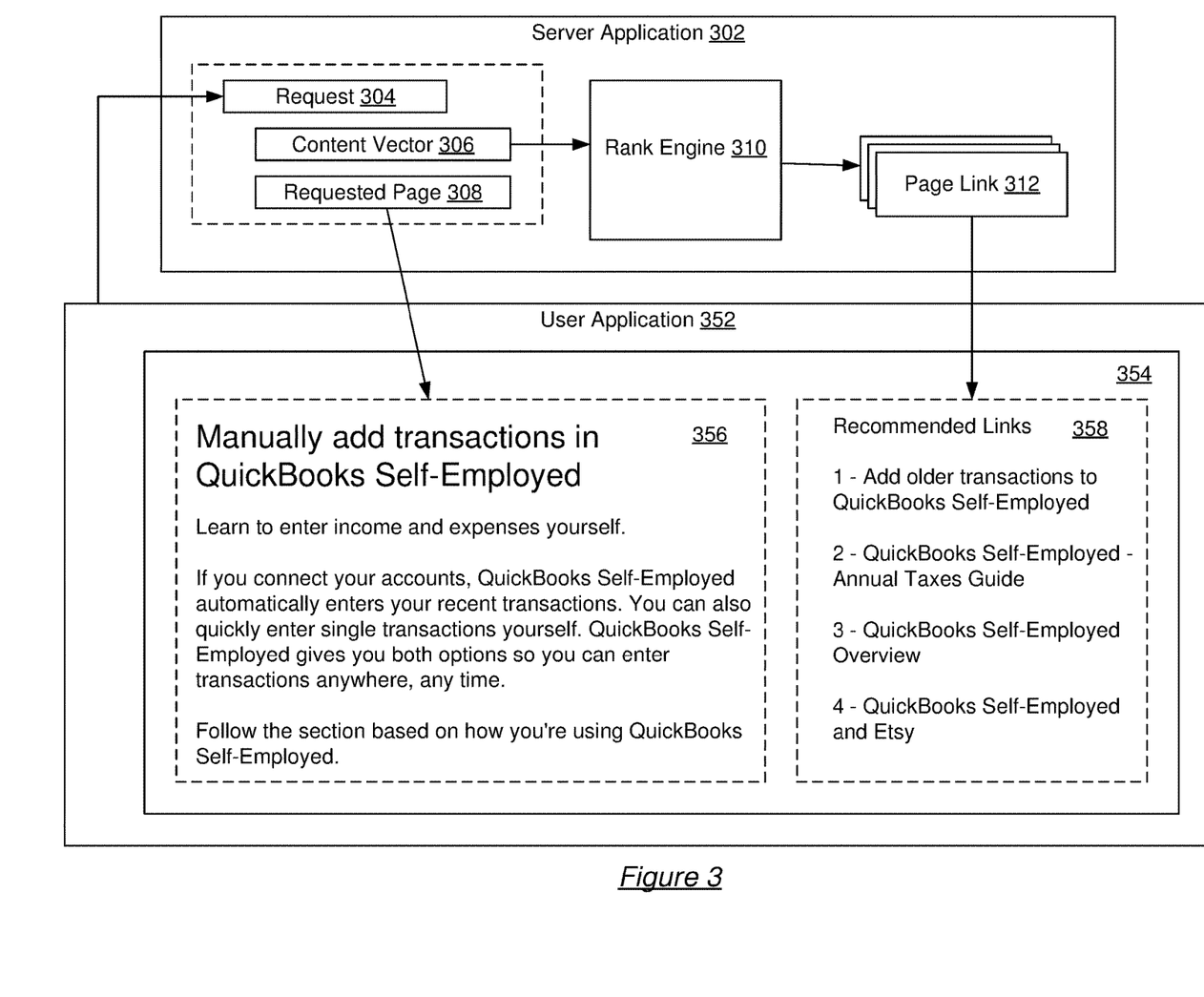
FIG. 3 shows examples in accordance with disclosed embodiments.

FIG. 3 shows examples of systems and interfaces in accordance with the disclosure. The embodiments of FIG. 3 may be combined and may include or be included within the features and embodiments described in the other figures of the application. The features and elements of FIG. 3 are, individually and as a combination, improvements to the technology of link recommendation computing systems. The various features, elements, widgets, components, and interfaces shown in FIG. 3 may be omitted, repeated, combined, and/or altered as shown. Accordingly, the scope of the present disclosure should not be considered limited to the specific arrangements shown in FIG. 3.

The user application (352) sends the request (304) to the server application (302). The request (304) may include a uniform resource identifier (URI) to identify a page from the system that a user has selected to view with the user application (352).

The server application (302) receives the request (304). The server application (302) identifies the requested page (308) as the page being requested by the request (304) with the URI from the request (304).

The server application (302) identifies the content vector (306) as the content vector that corresponds to the requested page (308). The content vector may have been previously generated from the text of the title ("Manually add transactions in QuickBooks Self-Employed") of the requested page (308) by a text encoder and stored in a database to which the server application has access.

Recommended links, including the page link (312), are identified for the content vector (306). The recommended links may be generated on demand (i.e., in response to receiving the request 304) or may be generated prior to receiving the request (304) and stored. For example, the recommended links for each page of the system may be generated in response to when the pages of the system are updated. The rank engine (310) may identify a number (e.g., 4) of highest recommended pages based on the content vector (306), from which the recommended links are generated.

The server application (302) may generate a transmission page that includes the content from the requested page (308) and the page link (312) of the recommended links. The server application (302) transmits the transmission page with the content from the requested page (308) and the recommended links to the user application (352).

The user application (352) receives and displays the transmission page in the browser (354). The browser (354) displays the section (356) with content from the requested page (308) and displays the section (354) that includes the recommended links with the page link (312). For example, the page link (312) may be to the page titled "Add older transactions to QuickBooks Self-Employed", which is the first recommended link. The page link (312) may be a cold start link to a cold start page for which the interaction data is below the threshold level, in contrast to the other recommended links in the section (358), which may include interaction data that is above the threshold level. By presenting the cold start link, even though the cold start link references a cold start page with insufficient interaction data, the system may reduce the number of clicks it takes for a user to find pertinent information.

Embodiments of the invention may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities that implement the features and elements of the disclosure.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 4A, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc.

Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
receiving a request that identifies a requested page;
identifying a content vector of the requested page, the content vector generated based on providing text of the requested page to a neural network text encoder;
selecting, based on a rank engine and the content vector, a link to a cold start page, the cold start page not satisfying a threshold level of interaction data, the rank engine having ranked the selected link above a second link to a warm page that does satisfy the threshold level of the interaction data; and
presenting the requested page with the selected link.

2. The method of claim 1, further comprising:
generating the content vector of a plurality of content vectors from the cold start page of a plurality of pages;
training a rank function used by the rank engine using the interaction data,
the rank function including a first matrix,
the first matrix having first matrix dimensions, and
a first dimension of the first matrix dimensions having a plurality of first elements for the plurality of pages and a second dimension of the first matrix dimensions having a plurality of second elements for a plurality of latent features corresponding to elements of the content vector;
generating a second matrix having second matrix dimensions,
the second matrix dimensions being the same as the first matrix dimensions, and
the second matrix generated from the plurality of content vectors; and
updating the first matrix with the second matrix to generate an updated first matrix that increases a rank of the cold start page above the warm page.

3. The method of claim 1,
wherein the rank engine is trained using the interaction data and a plurality of pages including the cold start page, the warm page, and the requested page,
wherein the threshold level of the interaction data is one selected from a group consisting of an amount of the interaction data, an age of the page, and an amount of cross links to the page from other pages of the plurality of pages,
wherein the warm page satisfies the threshold level of interaction data by including at least one of a threshold amount of interaction data, a threshold age, and a threshold amount of cross links, and
wherein the cold start page does not include at least one of the threshold amount of interaction data, the threshold age, and the threshold amount of cross links and does not satisfy the threshold level of interaction data.

4. The method of claim 1, further comprising:
training a rank function of the rank engine by:
generating a rank output from a rank input with the rank function,
comparing the rank output to a label with a loss function, and
updating a first matrix of the rank function based on the comparison of the rank output to the label prior to updating the first matrix with a second matrix generated from a plurality of content vectors including the content vector.

5. The method of claim 1, further comprising:
training a rank function of the rank engine by:
generating a rank input for the rank function, the rank input comprising a source vector and a target vector, the rank input labeled with a label,
the source vector being one of a plurality of content vectors identifying a source page,
the plurality of content vectors including the content vector,
the target vector being an identification vector identifying a target page, and
the label identifying whether the target page was clicked on from the source page.

6. The method of claim 1, further comprising:
generating the content vector by identifying a title of the cold start page, and converting a set of words from the title to word vectors.

7. The method of claim 1, wherein the neural network text encoder comprises one or more from a group consisting of a convolutional neural network, a long short term memory, and an attention mechanism.

8. A system comprising:
a processor;
a memory coupled to the processor; and
the memory comprising a server application, wherein the server application executes on the processor and is configured for:
receiving a request that identifies a requested page;
identifying a content vector of the requested page, the content vector generated based on providing text of the requested page to a neural network text encoder;
selecting, based on a rank engine and the content vector, a link to a cold start page, the cold start page not satisfying a threshold level of interaction data, the rank engine having ranked the selected link above a second link to a warm page that does satisfy the threshold level of the interaction data; and
presenting the requested page with the selected link.

9. The system of claim 8, wherein the memory further comprises a training application, wherein the training application executes on the processor and is configured for:
generating the content vector of a plurality of content vectors from the cold start page of a plurality of pages;
training a rank function used by the rank engine using the interaction data,
the rank function including a first matrix,
the first matrix having first matrix dimensions, and
a first dimension of the first matrix dimensions having a plurality of first elements for the plurality of pages and a second dimension of the first matrix dimensions having a plurality of second elements for a plurality of latent features corresponding to elements of the content vector;
generating a second matrix having second matrix dimensions,
the second matrix dimensions being the same as the first matrix dimensions, and
the second matrix generated from the plurality of content vectors; and
updating the first matrix with the second matrix to generate an updated first matrix that increases a rank of the cold start page above the warm page.

10. The system of claim 9, wherein the training application is further configured for:

training a rank function of the rank engine by:
generating a rank output from a rank input with the rank function,
comparing the rank output to a label with a loss function, and
updating a first matrix of the rank function based on the comparison of the rank output to the label prior to updating the first matrix with a second matrix.

11. The system of claim 9, wherein the training application is further configured for:
training a rank function of the rank engine by:
generating a rank input for the rank function, the rank input comprising a source vector and a target vector, the rank input labeled with a label,
the source vector being one of a plurality of content vectors identifying a source page,
the plurality of content vectors including the content vector,
the target vector being an identification vector identifying a target page, and
the label identifying whether the target page was clicked on from the source page.

12. The system of claim 8, wherein the server application is further configured for:
generating the content vector by:
identifying a title of the cold start page,
converting a set of words from the title to word vectors, and
generating the content vector by inputting the word vectors to a neural network text encoder.

13. The system of claim 12, wherein the neural network text encoder comprises one or more from a group consisting of a convolutional neural network, a long short term memory, and an attention mechanism.

14. The system of claim 8, further comprising:
a repository that stores the interaction data, a plurality of pages, a plurality of content vectors including the content vector, and a plurality of identification vectors.

15. A method comprising:
generating a content vector from a cold start page that does not satisfy a threshold level of interaction data, wherein a plurality of content vectors comprises the content vector and a plurality of pages comprises the cold start page and a warm page that satisfies the threshold level of the interaction data;
training a rank function using the interaction data,
the rank function comprising a first matrix,
the first matrix having first matrix dimensions comprising a first dimension and a second dimension, and
the first dimension comprising a plurality of first elements for the plurality of pages and the second dimension comprising a plurality of second elements for a plurality of latent features that correspond to elements of the content vector;
generating, based on the plurality of content vectors, a second matrix having second matrix dimensions, the second matrix dimensions being the same as the first matrix dimensions; and
generating, based on updating the first matrix with the second matrix, an updated first matrix that ranks the cold start page above the warm page.

16. The method of claim 15,
wherein the rank engine is trained using the interaction data and the plurality of pages including the cold start page, the warm page, and a requested page,
wherein the threshold level of interaction data is one selected from a group consisting of an amount of interaction data, an age of the page, and an amount of cross links to the page from other pages of the plurality of pages, wherein the warm page satisfies the threshold level of interaction data by including at least one of a threshold amount of interaction data, a threshold age, and a threshold amount of cross links, and wherein the cold start page does not include at least one of the threshold amount of interaction data, the threshold age, and the threshold amount of cross links and does not satisfy the threshold level of interaction data.

17. The method of claim 15, further comprising:
training the rank function by:
- generating a rank output from a rank input with the rank function,
- comparing the rank output to a label with a loss function, and
- updating a first matrix of the rank function based on the comparison of the rank output to the label prior to updating the first matrix with a second matrix generated from a plurality of content vectors including the content vector.

18. The method of claim 15, further comprising:
training the rank function by:
- generating a rank input for the rank function, the rank input comprising a source vector and a target vector, the rank input labeled with a label,
- the source vector being one of a plurality of content vectors identifying a source page,
- the plurality of content vectors including the content vector,
- the target vector being an identification vector identifying a target page, and
- the label identifying whether the target page was clicked on from the source page.

19. The method of claim 15, further comprising:
generating the content vector by identifying a title of the cold start page, and converting a set of words from the title to word vectors.

20. The method of claim 15, further comprising:
generating the content vector generated from content of the cold start page, wherein the content comprises text that is input to a neural network text encoder to generate the content vector, and wherein the neural network text encoder comprises one or more from a group consisting of a convolutional neural network, a long short term memory, and an attention mechanism; and presenting a requested page with a link to the cold start page.

* * * * *